United States Patent Office 3,799,933
Patented Mar. 26, 1974

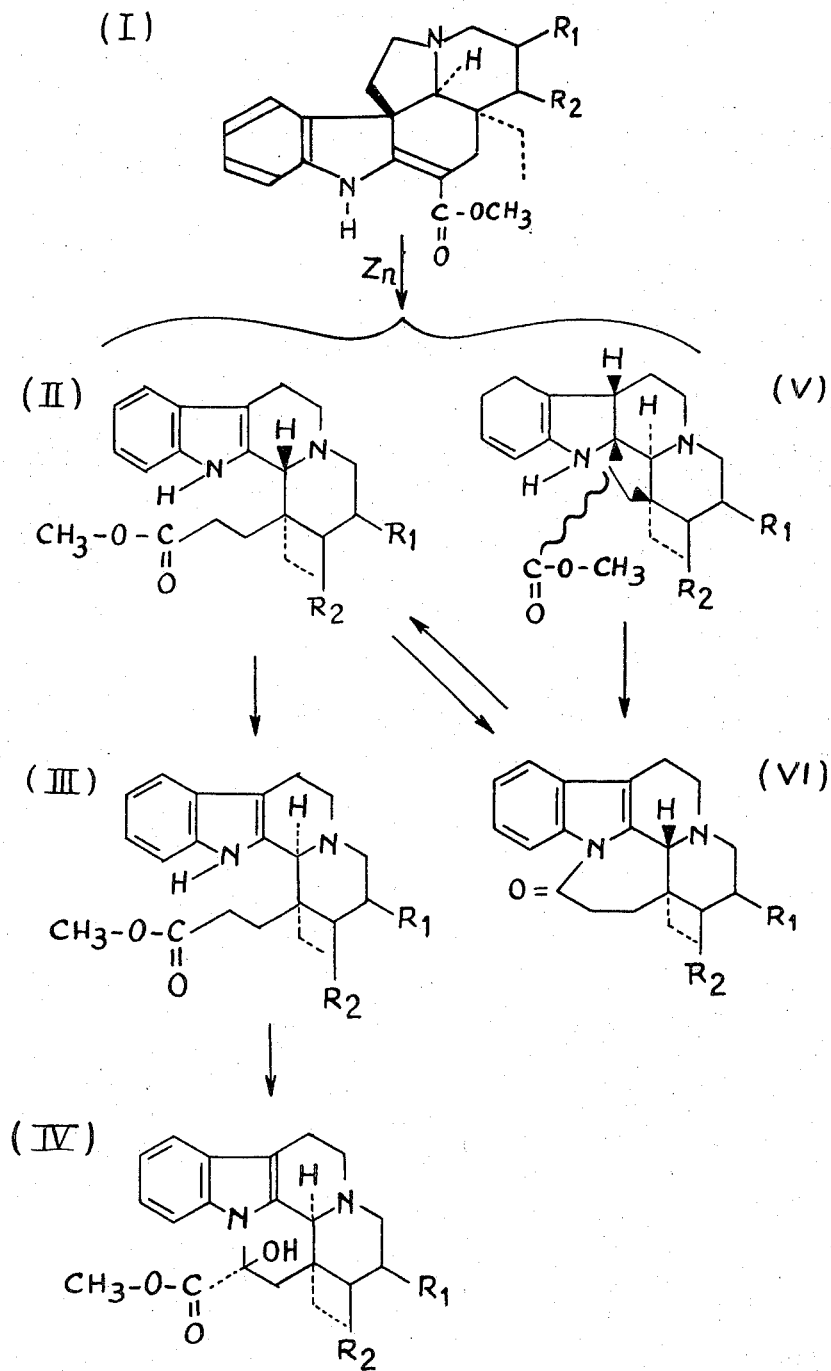

3,799,933
METHOD OF PREPARING NEW INDOLIC DERIVATIVES USABLE FOR SYNTHESIZING DEXTRO-ROTARY VINCAMINE
Jean George Le Men, 139 Boulevard Pommery, and Jean Levy, 108 Avenue d'Epernay, both of 51 Reims (Marne), France
Filed Oct. 22, 1971, Ser. No. 191,753
Claims priority, application France, Oct. 22, 1970, 7038181
Int. Cl. C07d 57/00
U.S. Cl. 260—293.53          6 Claims

ABSTRACT OF THE DISCLOSURE

Process for preparing dextro-rotatory vincamine, in which a (—) tabersonine of Formula I is re-arranged:

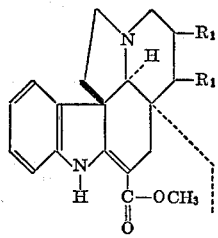

(in which $R_1$ and $R_2$ are hydrogen or form together an additional valency bond which is destroyed by reduction at any stage of the method) into a mixture from which a levorotatory amino ester is isolated by chromatography; this amino ester is oxidized into an immonium salt which is reduced to give the epimer of the amino ester obtained previously, in the form of its dextro-rotatory isomer. This is oxidized and the resulting product hydrolized to give the dextro-rotatory vincamine.

---

This invention concerns a method of preparing new indolic derivatives and their use as intermediate products for synthesizing dextro-rotatory vincamine, which is identical with natural vincamine.

Vincamine, an alkaloid of Formula IV illustrated in the formula sheet attached, in which $R_1$ and $R_2$ are hydrogen, is known for its therapeutic properties. It acts on the central nervous system and on the circulatory system (see L. Szporny and K. Szasz in Arch. Expt 1. Pathol, Pharmak. 236, 296 (1959), who report its sedative and hypotensive properties).

Vincamine may be extracted from Vinca minor L (Apocynaceae). This method can supply only relatively small quantities of product and at high prices because of the cost of the raw material. However it gives only the very active dextro-rotatory vincamine.

Kuehne proposed a method of total synthesis of racemic vincamine (Lloydia, 1964, 27, (4) 435-439: "The Synthesis of Vinca Minor Alkaloids," and U.S.P. No. 3,454,583). This synthesis involves a racemic amino ester of Formula II illustrated in the formula sheet ($R_1$ and $R_2$ being hydrogen) which, by oxidation with mercuric acetate and reduction by a borohydride, of the immonium salt formed, gives a mixture of epimeric amino esters (II and III).

By oxidizing the methylene adjacent to the carbomethoxy group of the epimer III using p-nitro-sodimethylamine and sodium triphenylmethylate in excess, and then carrying out an acid hydrolysis, racemic vincamine is obtained.

Kuehne prepares the racemic amino ester II by condensing tryptamine and dimethyl 4-ethyl-4-formyl-pimelate into a lactam and converting this into a thio-lactam by phosphorous pentasulphide, removing the sulphur by selective reduction using Raney nickel, and separating the two amino esters II and III by chromatography.

Thus the synthesis of Compounds II and III is long and difficult. Furthermore, Kuehne's method gives only racemic compounds and hence finally the dl-vincamine and not dextro-rotatory vincamine, identical with natural vincamine.

An alkaloid of configuration I, illustrated in the formula sheet is known, in which $R_1$ and $R_2$ form an additional valency bond which is largely free. This alkaloid, known as (—)tabersonine, is abundant in seeds of amsonia tabernaemontana and may be simply extracted from them using the method described by M–M. Janot, H. Pourrat and J. Le Men (Bull. Soc. Chim. Fr. 1954, p. 707).

In this method, seed powder made alkaline with ammonia is extracted by petroleum ether (B.P. 45–75° C.). By agitating this solution in petroleum ether with an aqueous normal solution of hydrochloric acid, a precipitate of (—)tabersonine hydrochloride is formed at the interphase, and this is isolated by filtration (yield about 10 g./kg.). (—)tabersonine may also be obtained with a yield of the order of 15 g./kg. from seeds of voacanga africana Stapf (apocynaceae) by the method described by N. Kunesch, O. Miet, M. Troly and J. Poisson (Ann. Pharm. Fr. 1968, 26 79) The (—)tabersonine provides, by catalytic hydrogenation, the dihydrotabersonine of configuration I in which $R_1=R_2=H$, as described by M–M. Janot, J. Le Men and C. Fan (C.R. Acad. Sc. 1959, 248, 3005).

It has now been found the levo-rotatory isomer of the amino ester of configuration II may be prepared from (—)tabersonine. The levo-rotatory amino ester obtained in this way gives, when converted using the final operation of Kuehne's synthesis, the (+)vincamine.

The purpose of the invention is thus a method of preparing dextro-rotatory vincamine, involving the rearrangement of a (—)tabersonine of configuration I, in which $R_1$ and $R_2$ are hydrogen or form together an additional valency bond which is destroyed at any stage of the method, into a mixture consisting of a levo-rotatory amino ester of configuration II and a pentacyclic derivative of configuration V; this amino ester is oxidized into an immonium salt which is reduced to give a dextro-rotatory amino ester of configuration III; this is oxidized and the oxidation product hydrolized to give the dextro-rotatory vincamine IV; the configurations I, II, III, IV and V are illustrated in the formula sheet attached.

We shall examine below in a more detailed fashion the various stages of the method according to the patent and the best way of executing them.

The first stage of the method consists of rearranging the (—)tabersonine (or its dihydrogenated derivative in 14, 15 -position).

This rearrangement may be carried out conveniently by treating (—)tabersonine I, possibly in the form of a hydrohalide, by zinc favorably activated by a copper salt, in boiling acetic acid. Usually granular zinc is used, to which are added a few crystals of a copper salt, such as copper sulphate. The reaction is continued under boiling with agitation for 2 to 12 hours. After cooling, the unreacted zinc is filtered off and the filtrate made alkaline. This alkalinization is carried out preferably using a mixture of ammonia and ice in order to keep the temperature of the mixture below about 0° C. The solution is then washed out by a suitable solvent, for example ether, and a residue is isolated from the ethereal solutions by washing, drying and distillation.

This residue is given a preparative chromatography. Eight fractions are detected by exposure to ultraviolet light and numbered from 1 to 8 (or four fractions numbered from 1 to 4 in the case of dihydrotabersonine) in increasing order of polarity (elution using an alcohol, for example methyl alcohol.)

Fraction 5 (or fraction 4 in the case of the dihydrogenated compound) contains the amino ester II to be converted in the subsequent stage of the method.

Fraction 7 (or fraction 2 for dihydrotabersonine) contains the pentacyclic derivative V. This derivative may be converted into the amino ester II. This conversion may be carried out on fraction 7 alone or on the two fractions 5 and 7 together and the treatment is then used for enriching in amino ester II.

When the derivative V is heated with an alkaline reagent, such as an alkaline alcoholate, for example sodium or potassium alcoholate, in an anhydrous organic solvent, for about 1 to 6 hours, at reflux temperature and in an inert gas atmosphere such as nitrogen, a reaction mixture is obtained which contains a lactam of configuration VI.

This lactam is also obtained from the amino ester II by proceeding under conditions similar to those indicated in the previous paragraph. Hence the treatment with alkaline reagent may equally well be carried out on fractions 5 and 7 together.

The lactam VI, treated by a hydroxide of an alkali metal, in a dilute alcoholic solution, provides an amino acid which may be easily converted into the amino ester II, for example by the action of diazomethane in an ethereal medium.

The amino ester II has been obtained in this way with a good yield and at fairly low cost. Furthermore this amino ester is levo-rotatory. It is then sufficient to apply to it the stages laid down in Kuehne's synthesis to obtain successively the hitherto unknown dextro-rotatory amino ester III, and the dextro-rotatory vincamine.

It was indicated above that the reduction of the additional valency formed by $R_1$ and $R_2$ could be carried out at any stage of the method according to the patent. This reduction is generally done catalytically, in particular in the presence of a platinum compound, in an organic solvent, for example in an alcohol or an ester.

The following examples illustrate the patent, without limiting it however. In these examples, the index $b$ used with the configurations of the derivatives prepared indicates that these are derivatives for which $R_1$ and $R_2$ are hydrogen, whereas the index $a$ refers to derivatives of which the configuration has a double bond in place of $R_1$ and $R_2$.

EXAMPLE 1

Preparation of derivatives $II_a$ and $V_a$ ($R_1$ and $R_2$ forming an additional valency bond)

A suspension of 12 g. of granular zinc in 120 ml. of acetic acid to which a few crystals of copper sulphate are added is boiled under reflux with agitation, and then a solution of 1.104 g. of (—)tabersonine hydrochloride in 20 ml. of acetic acid is added. The reaction mixture is agitated over a boiling water bath for 4 hours, and then cooled. The acetic solution, relieved of excess zinc by filtration, is made alkaline with ammonia in the presence of ice and systematically washed out by 150 ml. of ether. The combined ethereal solutions are washed in distilled water, dried over sodium sulphate and distilled to dryness to give a residue weighing 0.87 g.

This product is given a preparative chromatography on a thick layer of silica using a mixture of benzene (275 parts), ether (25 parts), ammonia (3 parts) as eluant.

Eight fractions are detected by exposure to ultraviolet light and numbered from 1 to 8 in order of increasing polarity. The constituents of each fraction are eluted with methyl alcohol:

Amino ester $II_a$

The elution of fraction 5 gives, after evaporation, 0.16 g. of a product which is crystallized in the methyl alcohol: F. 119–120° C. (Kofler microscope with heated stage, uncorrected); $[\alpha]_D 20 = -21°$ (methyl alcohol, c.= 0.75); UV. spectrum [λ max in mμ (log ε)]; 26 (4.57); 273 (3.81); 284 (3.83); 292 (3.75); I.R. spectrum: bands at 1725 cm.$^{-1}$, 3440 cm.$^{-1}$; mass spectrum: calculated for $C_{21}H_{26}O_2N_2$; M$^+$=338; main peaks at m./e. 169, 170, 338.

Derivative $V_a$

Elution of fraction 7 give, after evaporation, 0.538 g. of a product which is crystallized in the methyl alcohol: F. 106° C. (K.n.c.); $[\alpha]_D^{20} = +35°$ (methyl alcohol, c.= 0.97); U.V. spectrum [λ max in mμ (log ε)]: 247 (3.91); 299 (347); I.R. spectrum: bands at 1725 cm.$^{-1}$, 1610 cm.$^{-1}$; mass spectrum: calculated for $C_{21}H_{26}O_2H_2$; M$^+$= 338; M$^+$ found=338; main peaks at m./e. 130, 139, 144, 169, 170, 251, 265, 279, 280, 309, 337, 338.

EXAMPLE 2

Preparation of derivatives $II_b$ and $V_b$ ($R_1=R_2=H$)

(a) 0.23 g. amorphous hydrochloride of 14, 15-dihydro-tabersonine are treated in the same way as in Example 1 above in 30 ml. of acetic acid, in the presence of 5 g. of zinc and a few crystals of copper sulphate to give a product weighing 0.18 g.

Separation by chromatography, carried out as in Example 1, shows the presence of 4 fractions, numbered from 1 to 4, in order of increasing polarity, of which the constituents are isolated by elution.

Amino ester $II_b$

Elution of fraction 4 gives 27 mg. of an amorphous product which has not been able to be crystallized $[\alpha]_D^{20} = -72°$ C. (methyl alcohol, c.=0.92); U.V. spectrum [λ max mμ (log ε)]; 226 (4.50); 284 (3.80); 291 (3.73); I.R. spectrum: bands at 1735 cm.$^{-1}$, 3455 cm.$^{-1}$; I.R. spectrum identical with the spectrum of a synthetic product prepared in the racemic form by Kuehne (M. E. Kuehne, Lloydia 1964, 27, 435); mass spectrum: calculated for $C_{21}H_{28}O_2N_2$; M$^+$=340, M$^+$ found=340; main peaks at m./e. 124, 169, 170, 185, 197, 267, 268, 281, 325, 339, 340.

Derivative $V_b$

Elution of fraction 2 gives 66 mg. of a homogeneous product, which is crystallized in the methyl alcohol. F. 70–72° C. (K.,n.c.); $[\alpha]_D^{20} = +5°$ (methyl alcohol, c.=0.86); U.V. spectrum [λ max in mμ (log ε)]; 246 (395), 297 (3.47); I.R. spectrum: bands at 1740 cm.$^{-1}$, 3740 cm$^{-1}$; main peaks at m./e. 124, 254, 281, 339, 340.

EXAMPLE 3

Preparation of $II_v$ from $II_a$ and of $V_b$ from $V_a$ by catalytic hydrogenation (a) A solution of 10 mg. of Compound $II_a$ in 2 ml. of methyl alcohol is catalytically hydrogenated for 3 hours at atmospheric pressure, in the presence of Adams platinum oxide previously saturated with hydrogen.

After fitration and evaporation of the solvent, 8 mg. of derivative identical in all respects [$(\alpha)_D$, I.R., U.V. mass spectrum, thin layer chromatography (t.l.c.)] with Compound $II_b$ described in Example 2 above, are isolated.

(b) A solution of 41 mg. of Compound $V_a$ in 3 ml. of methyl alcohol is catalytically hydrogenated for 4 hours at atmospheric pressure, in the presence of 25 mg. of Adams platinum oxide previously saturated with hydrogen.

After filtration and evaporation of the solvent, 38 mg. of a derivative which is homogeneous in thin layer chromatography, crystallizing in the methyl alcohol, are isolated. This derivative is identical in all respects (F, $[\alpha]_D$, I.R., U.V., mass spectrum, t.l.c.) with the derivative $V_b$ described in Example 2 above.

EXAMPLE 4

Preparation of derivative $VI_a$ from $II_a$ or from $V_a$ by action of potassium terbutylate (a) The solution of 26 mg. of derivative $II_a$ in 25 ml. of anhydrous benzene is heated in the presence of 50 mg. of potassium terbutylate, under reflux for 2 hours in a nitrogen atmosphere.

The reaction mixture is poured into 15 ml. of hydrochloric acid dilution with ice and the benzene is systematically washed out by a dilute solution of hydrochloric acid.

The combined aqueous acidic phases are alkalized by ammonia and extracted by 100 ml. of ether.

The ethereal solution, dried over sodium sulphate, is distilled and then gives 15 mg. of a translucent gum which is purified by a preparative thin layer chromatography on a layer of silica using as eluant the mixture benzene (175 parts), ether (25 parts), ammonia (2 parts). In this way 11 mg. of amorphous derivative VI, homogeneous in t.l.c. are isolated: $[\alpha]_D 20 = +98°$ (methyl alcohol. c=1.05), U.V. spectrum [$\lambda$ max in m$\mu$ (log $\epsilon$)]: 213 (4.08), 242 (4.05), 266 (3.89), 293 (3.63), 303 (3.62); I.R. spectrum: band at 1705 cm.$^{-1}$; mass spectrum: calculated for $C_{20}H_{22}ON_2$, $M^+ = 306$, $M^+$ found=306, main peaks at m./e. 121, 129, 130, 144, 149, 168, 169, 170, 171, 235, 249, 250, 251, 263, 275, 277, 278, 289, 290, 291, 306.

(b) 38 mg. of the derivative $V_a$ are reacted with potassium terbutylate under the same conditions as those described in paragraph (a) of the present example.

10.5 mg. of a compound identical in all respects ($[\alpha]_D$, U.V., I.R., t.l.c. mass spectrum) with the derivative $VI_a$ described above are prepared in this way

EXAMPLE 5

Preparation of derivative $VI_b$ from $II_b$ and $V_b$ by the action of potassium terbutylate (a) 18 mg. of the derivative $II_b$ are reacted with potassium terbutylate under the same conditions as those described in Example 4 above, giving 10 mg. of Compound $VI_b$, crystallized in ether: F. 152° C. (K., n.c.) $[\alpha]_D^{20} = +15°$ (methyl alcohol, c.=0.83); U.V. spectrum [$\lambda$ max in m$\mu$ (log $\epsilon$)]; 241 (4.19), 267 (4.03), 293 (3.70), 300 (3.66); I.R. spectrum: band at 1700 cm.$^{-1}$; mass spectrum: calculated for $C_{20}H_{24}ON_2$; $M^+=308$; $M^+$ found=308, main peaks at m./e. 105, 107, 108, 109, 111, 119, 121, 122, 135, 136, 137, 149, 177, 217, 307, 308.

(b) 40 mg. of derivative $V_b$, reacted with potassium terbutylate under the same conditions as those described in Example 4 above, give 17 mg. of a compound crystallized in ether, identical in all respects (F, U.V., I.R., $[\alpha]_D$, t.l.c. mass spectrum) with the compound $VI_b$ described above.

EXAMPLE 6

Conversion of the derivative $VI_b$ (homo-epi-21-vincamone) to the tetracyclic saturated ester $II_b$ The solution of 300 mg. of $VI_b$ in 15 ml. of 2 N potassium methylate is heated under reflux for 8 hours, then after addition of 15 ml. of water is stripped of methyl alcohol by vacuum distillation with a water jet pump. After cooling to 0° C., the solution is brought to pH 5 with a sufficient quantity of acetic acid, then made alkaline to pH 12 with a sufficient quantity of ammonia.

While the above ammoniacal solution is being heated over a water bath, a precipitate of free amino acid slowly appears which is collected by filtration and dried under vacuum at 30° C. With no other purification, the dry precipitate is introduced into a mixture of 2 ml. of methyl alcohol, 5 ml. of chloroform and 20 ml. of ether.

A solution of 1 g. of diazomethane in 25 ml. of ether is added drop by drop to this suspension over a period of 3 hours, with continuous agitation and at 0° C.

This reaction solution is left to stand for 24 hours at 0° C. in a stoppered flask, then a small insolubule residue is removed by filtration and extracted by twice 20 ml. of normal sulphuric acid. The two acid solutions obtained are combined, brought to pH 8 by a sufficient quantity of soda, and extracted by three times 50 ml. of chloroform. The chloroformic solutions are washed in water, dried with sodium sulphate and stripped of solvent by distillation, and give a residue weighing 210 mg.

The solution of this residue in 20 ml. of benzene is filtered through a column of 6 g. of alumina. By elution with 200 ml. of benzene, a fraction is obtained, after removal of the solvent, consisting of an amorphous product $[\alpha]_D = -72°$ (methyl alcohol, c.=1) in all respects identical with the tetracyclic saturated ester $II_b$ of Example 2.

EXAMPLE 7

Example 6 is repeated, but replacing the derivative $VI_b$ by derivative $VI_a$ and derivative $II_a$ is obtained.

EXAMPLE 8

Preparation of $VI_b$ from $VI_a$

The catalytic hydrogenation of 10 mg. of Compound $VI_a$ under conditions identical to those described in Example 3 above gives 8 mg. of a compound, crystallized in ether, identical in all respects (F, U.V., I.R., $[\alpha]_D^{20}$, t.l.c., mass spectrum) with the Compound $VI_b$ described in Example 5.

EXAMPLE 9

Preparation of dextro-rotatory vincamine

A solution of 13.0 mg. (0.0038 mole) of the amino ester $II_b$ and 24 mg. (0.0075 mole) of mercuric acetate in 6 ml. of acetic acid is heated for 4 hours at 59° C. After concentration under vacuum, 10 ml. of absolute ethyl alcohol and 0.5 g. of sodium borohydride are added, the solution agitated for 15 hours at ambient temperature, then acidified, then 50 ml. of water and an excess of soda are added. After ether extraction, concentration gives a mixture of the amino esters $II_b$ and $III_b$, which are separated by chromatography. A solution of 33 mg. (0.10 mole) of the amino ester $III_b$ $[\alpha]_D^{20}$: $+29°$ (methyl alcohol) which elutes more quickly, in 10 ml. of anhydrous ether, is treated by an excess of sodium triphenylmethylate in ether. After 25 minutes, 15 mg. (0.10) mole of p-nitroso-N,N-dimethylaniline in 10 ml. of dry dioxane are added and the reaction mixture is agitated for 6 hours at 25° C. Then 5 ml. of water are added and, after 15 minutes, the reaction medium is poured into 50 ml. of water, and five extractions carried out using 30 ml. portions of ether.

By vacuum concentration, acidification by 3% hydrochloric acid in excess, addition after 10 minutes of an aqueous solution of soda in excess, extraction by dichloromethane and concentration of the extracts, a mixture is obtained of which the first fraction, obtained by thin layer chromatography on alumina, with 0.5% methyl alcohol solution in dichloromethane, is the required dextro-rotary vincamine $[\alpha]_D^{20}=41°$ (pyridine, c.=1).

EXAMPLE 10

Example 9 is repeated, but replacing the amino ester $II_b$ by the amino ester $II_a$. The product obtained is reduced catalytically by reduced platinum to give the dextro-rotatory vincamine: $[\alpha]_D^{20}=+41°$ (pyridine, c.=1).

What is claimed is:
1. Process for preparing the levo-rotatory isomer of a compound of Formula II:

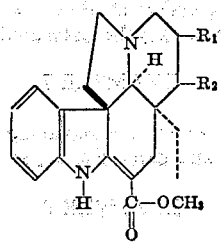

in which $R_1$ and $R_2$ each represent a hydrogen atom or together form an additional valency bond, characterized by the fact that a levo-rotatory tabersonine of Formula I:

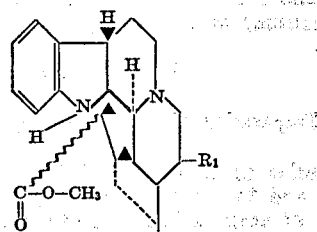

(in which $R_1$ and $R_2$ are defined above) is made to react with zinc in boiling acetic acid and from the mixture obtained, is separated by chromatography non-vapor phase the levo-rotatory isomer of compound of configuration II above and a pentacyclic compound of Formula V:

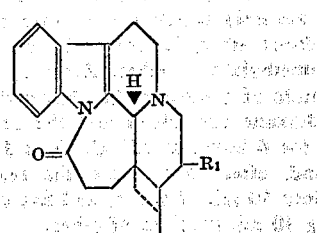

(in which $R_1$ and $R_2$ are as defined above) and that, optionally the compound of Formula V is converted into the levo-rotatory isomer of the compound of Formula II by the following stages:
 (a) the compound of Formula V is treated by an alkaline reagent and a lactam of Formula VI is obtained:

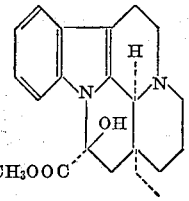

(in which $R_1$ and $R_2$ are defined above);
 (b) the lactam of Formula VI is converted into an amino acid by an alkaline metal hydroxide in an alcoholic medium;
 (c) the amino acid obtained is reacted with diazomethane to give the levo-rotatory isomer of the compound of configuration II.

2. Process according to claim 1, in which during the first stage, the zinc is activated by addition of a copper salt to the reaction medium.

3. Process according to claim 1, in which the stages a, b and c are applied to a mixture of the pentacyclic compound of Formula V and the levo-rotatory isomer of the compound of Formula II.

4. Process according to claim 1, in which during stage (a) an alkaline terbutylate is used as alkaline reagent, and the reaction is carried out in an organic solvent and in an inert atmosphere.

5. Process for preparing dextro-rotatory vincamine of formula:

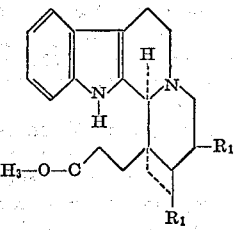

in which the starting material is the levo-rotatory isomer of the compound of configuration II obtained according to claim 1, this is oxidized by mercuric acetate into an immonium salt which is then reduced by an alkaline borohydride, into the dextro-rotatory isomer of the compound of Formula III:

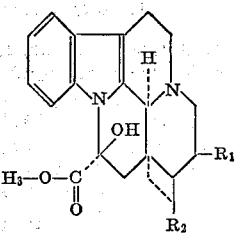

this latter compound is converted, by reaction with p-nitrosodimethyl-amine and sodium triphenylmethylate, followed by acid hydrolysis, into the compound of Formula IV:

and, in the case where $R_1$ and $R_2$, in Formula I, II, III, IV or V, form together an additional valency bond, the double bond is reduced at any stage of the method so as to give, in the final stage, the dextro-rotatory vincamine.

6. Process according to claim 5, in which said double bond is reduced catalytically by a compound of platinum in an organic solvent.

References Cited
UNITED STATES PATENTS
3,542,796  11/1970  Schut _____ 260—295
3,454,583  7/1969  Kuehne _____ 260—294.3

HENRY R. JILES, Primary Examiner
G. T. TODD, Assistant Examiner

U.S. Cl. X.R.
260—239.3 D